United States Patent
Gu et al.

(10) Patent No.: US 9,615,100 B2
(45) Date of Patent: *Apr. 4, 2017

(54) SECOND-ORDER ORTHOGONAL SPATIAL INTRA PREDICTION

(71) Applicant: Google Inc., Mountain View, CA (US)

(72) Inventors: Qunshan Gu, Hayward, CA (US); Yaowu Xu, Sunnyvale, CA (US)

(73) Assignee: GOOGLE INC., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/884,080

(22) Filed: Oct. 15, 2015

(65) Prior Publication Data

US 2016/0037174 A1   Feb. 4, 2016

Related U.S. Application Data

(63) Continuation of application No. 13/570,497, filed on Aug. 9, 2012, now Pat. No. 9,167,268.

(51) Int. Cl.
*H04N 19/44* (2014.01)
*H04N 19/176* (2014.01)
(Continued)

(52) U.S. Cl.
CPC ......... *H04N 19/176* (2014.11); *H04N 19/172* (2014.11); *H04N 19/182* (2014.11);
(Continued)

(58) Field of Classification Search
CPC ..... H04N 19/172; H04N 19/176; H04N 19/61
(Continued)

(56) References Cited

U.S. PATENT DOCUMENTS 5,150,209 A    9/1992  Baker et al.
5,708,473 A    1/1998  Mead
(Continued)

FOREIGN PATENT DOCUMENTS

JP     2007267414 A    10/2007

OTHER PUBLICATIONS

Bankoski et al. "Technical Overview of VP8, An Open Source Video CODEC for the Web". Dated Jul. 11, 2011.
(Continued)

*Primary Examiner* — Jamie Atala
*Assistant Examiner* — Nguyen Truong
(74) *Attorney, Agent, or Firm* — Young Basile Hanlon & MacFarlane, P.C.

(57) ABSTRACT

Second-order orthogonal spatial intra-prediction may include generating a reconstructed frame by generating a plurality of reconstructed blocks by decoding a portion of the current encoded frame, generating a decoded residual block by decoding a current block from the current encoded frame, identifying a current pixel location in the current block, identifying reconstructed pixels in respective reconstructed blocks, wherein first and second reconstructed pixels are at respective oblique angle to the current pixel location, and a third reconstructed pixel at the second oblique angle to the first reconstructed pixel or at the first oblique angle to the second reconstructed pixel, determining a predictor pixel for the current pixel location using a difference between the third reconstructed pixel and a sum of the first reconstructed pixel and the second reconstructed pixel, and identifying a reconstructed pixel as a sum of the predictor pixel and a corresponding residual pixel.

20 Claims, 11 Drawing Sheets

(51) Int. Cl.
*H04N 19/61* (2014.01)
*H04N 19/172* (2014.01)
*H04N 19/182* (2014.01)
*H04N 19/513* (2014.01)
*H04N 19/593* (2014.01)

(52) U.S. Cl.
CPC ........... *H04N 19/44* (2014.11); *H04N 19/513* (2014.11); *H04N 19/593* (2014.11); *H04N 19/61* (2014.11)

(58) Field of Classification Search
USPC .................................................. 375/240.16
See application file for complete search history.

(56) References Cited

U.S. PATENT DOCUMENTS

| | | | |
|---|---|---|---|
| 5,916,449 A | 6/1999 | Ellwart et al. | |
| 5,930,387 A | 7/1999 | Chan et al. | |
| 5,956,467 A | 9/1999 | Rabbani et al. | |
| 6,005,625 A | 12/1999 | Yokoyama | |
| 6,044,166 A | 3/2000 | Bassman et al. | |
| 6,058,211 A | 5/2000 | Bormans et al. | |
| 6,314,208 B1 | 11/2001 | Konstantinides et al. | |
| 6,473,460 B1 | 10/2002 | Topper | |
| 6,611,620 B1 | 8/2003 | Kobayashi et al. | |
| 6,654,419 B1 | 11/2003 | Sriram et al. | |
| 6,785,425 B1 | 8/2004 | Feder et al. | |
| 6,798,901 B1 | 9/2004 | Acharya et al. | |
| 7,106,910 B2 | 9/2006 | Acharya et al. | |
| 7,116,830 B2 | 10/2006 | Srinivasan | |
| 7,158,681 B2 | 1/2007 | Persiantsev | |
| 7,197,070 B1 | 3/2007 | Zhang et al. | |
| 7,218,674 B2 | 5/2007 | Kuo | |
| 7,263,125 B2 | 8/2007 | Lainema | |
| 7,333,544 B2 | 2/2008 | Kim et al. | |
| 7,466,774 B2 | 12/2008 | Boyce | |
| 7,602,851 B2 | 10/2009 | Lee et al. | |
| 7,689,051 B2 | 3/2010 | Mukerjee | |
| 7,924,918 B2 | 4/2011 | Lelescu et al. | |
| 8,094,722 B2 | 1/2012 | Wang | |
| 8,111,914 B2 | 2/2012 | Lee et al. | |
| 8,135,064 B2 | 3/2012 | Tasaka et al. | |
| 8,320,470 B2 | 11/2012 | Huang et al. | |
| 8,369,402 B2 | 2/2013 | Kobayashi et al. | |
| 8,559,512 B2 | 10/2013 | Paz | |
| 8,885,956 B2 | 11/2014 | Sato | |
| 9,167,268 B1 | 10/2015 | Gu et al. | |
| 9,247,251 B1 | 1/2016 | Bultje | |
| 2002/0017565 A1 | 2/2002 | Ju et al. | |
| 2002/0026639 A1 | 2/2002 | Haneda | |
| 2003/0202705 A1 | 10/2003 | Sun | |
| 2003/0215018 A1 | 11/2003 | MacInnis et al. | |
| 2003/0215135 A1 | 11/2003 | Caron et al. | |
| 2003/0234795 A1 | 12/2003 | Lee | |
| 2004/0001634 A1 | 1/2004 | Mehrotra | |
| 2004/0101045 A1 | 5/2004 | Yu et al. | |
| 2004/0252886 A1 | 12/2004 | Pan et al. | |
| 2005/0068208 A1 | 3/2005 | Liang et al. | |
| 2005/0078754 A1 | 4/2005 | Liang et al. | |
| 2005/0123207 A1 | 6/2005 | Marpe et al. | |
| 2005/0180500 A1 | 8/2005 | Chiang et al. | |
| 2006/0056689 A1 | 3/2006 | Wittebrood et al. | |
| 2006/0078754 A1 | 4/2006 | Murakami et al. | |
| 2006/0164543 A1 | 7/2006 | Richardson et al. | |
| 2006/0203916 A1 | 9/2006 | Chandramouly et al. | |
| 2006/0215751 A1 | 9/2006 | Reichel et al. | |
| 2007/0025441 A1 | 2/2007 | Ugur et al. | |
| 2007/0036354 A1 | 2/2007 | Wee et al. | |
| 2007/0076964 A1 | 4/2007 | Song | |
| 2007/0080971 A1 | 4/2007 | Sung | |
| 2007/0121100 A1 | 5/2007 | Divo | |
| 2007/0177673 A1 | 8/2007 | Yang | |
| 2007/0216777 A1 | 9/2007 | Quan et al. | |
| 2007/0217701 A1 | 9/2007 | Liu et al. | |
| 2008/0069440 A1 | 3/2008 | Forutanpour | |
| 2008/0123750 A1 | 5/2008 | Bronstein et al. | |
| 2008/0170615 A1 | 7/2008 | Sekiguchi et al. | |
| 2008/0212678 A1 | 9/2008 | Booth et al. | |
| 2008/0239354 A1 | 10/2008 | Usui | |
| 2008/0260042 A1 | 10/2008 | Shah et al. | |
| 2008/0294962 A1 | 11/2008 | Goel | |
| 2008/0310745 A1 | 12/2008 | Ye et al. | |
| 2009/0041119 A1 | 2/2009 | Thoreau et al. | |
| 2009/0161763 A1 | 6/2009 | Rossignol et al. | |
| 2009/0190659 A1 | 7/2009 | Lee et al. | |
| 2009/0232401 A1 | 9/2009 | Yamashita et al. | |
| 2009/0257492 A1 | 10/2009 | Andersson et al. | |
| 2010/0021009 A1 | 1/2010 | Yao | |
| 2010/0034265 A1 | 2/2010 | Kim et al. | |
| 2010/0034268 A1 | 2/2010 | Kusakabe et al. | |
| 2010/0104021 A1 | 4/2010 | Schmit | |
| 2010/0111182 A1 | 5/2010 | Karczewicz et al. | |
| 2010/0118943 A1 | 5/2010 | Shiodera et al. | |
| 2010/0118945 A1 | 5/2010 | Wada et al. | |
| 2010/0195715 A1 | 8/2010 | Liu et al. | |
| 2010/0266008 A1 | 10/2010 | Reznik | |
| 2010/0312811 A1 | 12/2010 | Reznik | |
| 2011/0002541 A1 | 1/2011 | Varekamp | |
| 2011/0026591 A1 | 2/2011 | Bauza et al. | |
| 2011/0033125 A1 | 2/2011 | Shiraishi | |
| 2011/0069890 A1 | 3/2011 | Besley | |
| 2011/0158529 A1 | 6/2011 | Malik | |
| 2011/0170595 A1 | 7/2011 | Shi et al. | |
| 2011/0170596 A1 | 7/2011 | Shi et al. | |
| 2011/0170597 A1 | 7/2011 | Shi et al. | |
| 2011/0170608 A1 | 7/2011 | Shi et al. | |
| 2011/0206135 A1 | 8/2011 | Drugeon et al. | |
| 2011/0206289 A1 | 8/2011 | Dikbas et al. | |
| 2011/0211757 A1 | 9/2011 | Kim et al. | |
| 2011/0216834 A1 | 9/2011 | Zhou | |
| 2011/0235706 A1 | 9/2011 | Demircin et al. | |
| 2011/0243225 A1 | 10/2011 | Min et al. | |
| 2011/0243229 A1 | 10/2011 | Kim et al. | |
| 2011/0243230 A1 | 10/2011 | Liu | |
| 2011/0249741 A1 | 10/2011 | Zhao et al. | |
| 2011/0255592 A1 | 10/2011 | Sung et al. | |
| 2011/0268359 A1 | 11/2011 | Steinberg et al. | |
| 2011/0293001 A1 | 12/2011 | Lim et al. | |
| 2012/0014439 A1 | 1/2012 | Segall et al. | |
| 2012/0014444 A1 | 1/2012 | Min et al. | |
| 2012/0020408 A1 | 1/2012 | Chen et al. | |
| 2012/0039384 A1 | 2/2012 | Reznik | |
| 2012/0039388 A1 | 2/2012 | Kim et al. | |
| 2012/0063691 A1 | 3/2012 | Yu et al. | |
| 2012/0082220 A1 | 4/2012 | Mazurenko et al. | |
| 2012/0177108 A1 | 7/2012 | Joshi et al. | |
| 2012/0287986 A1 | 11/2012 | Paniconi et al. | |
| 2012/0287998 A1 | 11/2012 | Sato | |
| 2012/0300837 A1 | 11/2012 | Wilkins et al. | |
| 2012/0307884 A1 | 12/2012 | MacInnis | |
| 2012/0320975 A1 | 12/2012 | Kim et al. | |
| 2013/0027230 A1 | 1/2013 | Marpe et al. | |
| 2013/0121415 A1 | 5/2013 | Wahadaniah et al. | |
| 2014/0044166 A1 | 2/2014 | Xu et al. | |

OTHER PUBLICATIONS

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

International Search Report and Written Opinion in related matter PCT/US2013/054370, mailed Apr. 3, 2014.

Mozilla, "Introduction to Video Coding Part 1: Transform Coding", Video Compression Overview, Mar. 2012, 171 pp.

(56) References Cited

OTHER PUBLICATIONS

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

SU M_T Sun University of Washington et al. "Encoder Optimization for H.264/AVC Fidelity Range Extensions" Jul. 12, 2005.

VP6 Bitstream & Decoder Specification. Version 1.02. On2 Technologies, Inc. Dated Aug. 17, 2006.

VP6 Bitstream & Decoder Specification. Version 1.03. On2 Technologies, Inc. Dated Oct. 29, 2007.

VP8 Data Format and Decoding Guide. WebM Project. Google On2. Dated: Dec. 1, 2010.

| | | |
|---|---|---|
| TL<br>BLOCK$_{0,0}$ | T<br>BLOCK$_{1,0}$ | TR<br>BLOCK$_{2,0}$ |
| L<br>BLOCK$_{0,1}$ | X<br>BLOCK$_{1,1}$ | R<br>BLOCK$_{2,1}$ |
| BL<br>BLOCK$_{0,2}$ | B<br>BLOCK$_{1,2}$ | BR<br>BLOCK$_{2,2}$ |

FIG. 5

| $TL_{0,0}$ | $TL_{1,0}$ | $TL_{2,0}$ | $TL_{3,0}$ | | $T_{0,0}$ | $T_{1,0}$ | $T_{2,0}$ | $T_{3,0}$ | | $TR_{0,0}$ | $TR_{1,0}$ | $TR_{2,0}$ | $TR_{3,0}$ |
|---|---|---|---|---|---|---|---|---|---|---|---|---|---|
| $TL_{0,1}$ | $TL_{1,1}$ | $TL_{2,1}$ | $TL_{3,1}$ | | $T_{0,1}$ | $T_{1,1}$ | $T_{2,1}$ | $T_{3,1}$ | | $TR_{0,1}$ | $TR_{1,1}$ | $TR_{2,1}$ | $TR_{3,1}$ |
| $TL_{0,2}$ | $TL_{1,2}$ | $TL_{2,2}$ | $TL_{3,2}$ | | $T_{0,2}$ | $T_{1,2}$ | $T_{2,2}$ | $T_{3,2}$ | | $TR_{0,2}$ | $TR_{1,2}$ | $TR_{2,2}$ | $TR_{3,2}$ |
| $TL_{0,3}$ | $TL_{1,3}$ | $TL_{2,3}$ | $TL_{3,3}$ | | $T_{0,3}$ | $T_{1,3}$ | $T_{2,3}$ | $T_{3,3}$ | | $TR_{0,3}$ | $TR_{1,3}$ | $TR_{2,3}$ | $TR_{3,3}$ |
| $L_{0,0}$ | $L_{1,0}$ | $L_{2,0}$ | $L_{3,0}$ | | $X_{0,0}$ | $X_{1,0}$ | $X_{2,0}$ | $X_{3,0}$ | | $R_{0,0}$ | $R_{1,0}$ | $R_{2,0}$ | $R_{3,0}$ |
| $L_{0,1}$ | $L_{1,1}$ | $L_{2,1}$ | $L_{3,1}$ | | $X_{0,1}$ | $X_{1,1}$ | $X_{2,1}$ | $X_{3,1}$ | | $R_{0,1}$ | $R_{1,1}$ | $R_{2,1}$ | $R_{3,1}$ |
| $L_{0,2}$ | $L_{1,2}$ | $L_{2,2}$ | $L_{3,2}$ | | $X_{0,2}$ | $X_{1,2}$ | $X_{2,2}$ | $X_{3,2}$ | | $R_{0,2}$ | $R_{1,2}$ | $R_{2,2}$ | $R_{3,2}$ |
| $L_{0,3}$ | $L_{1,3}$ | $L_{2,3}$ | $L_{3,3}$ | | $X_{0,3}$ | $X_{1,3}$ | $X_{2,3}$ | $X_{3,3}$ | | $R_{0,3}$ | $R_{1,3}$ | $R_{2,3}$ | $R_{3,3}$ |
| $BL_{0,0}$ | $BL_{1,0}$ | $BL_{2,0}$ | $BL_{3,0}$ | | $B_{0,0}$ | $B_{1,0}$ | $B_{2,0}$ | $B_{3,0}$ | | $BR_{0,0}$ | $BR_{1,0}$ | $BR_{2,0}$ | $BR_{3,0}$ |
| $BL_{0,1}$ | $BL_{1,1}$ | $BL_{2,1}$ | $BL_{3,1}$ | | $B_{0,1}$ | $B_{1,1}$ | $B_{2,1}$ | $B_{3,1}$ | | $BR_{0,1}$ | $BR_{1,1}$ | $BR_{2,1}$ | $BR_{3,1}$ |
| $BL_{0,2}$ | $BL_{1,2}$ | $BL_{2,2}$ | $BL_{3,2}$ | | $B_{0,2}$ | $B_{1,2}$ | $B_{2,2}$ | $B_{3,2}$ | | $BR_{0,2}$ | $BR_{1,2}$ | $BR_{2,2}$ | $BR_{3,2}$ |
| $BL_{0,3}$ | $BL_{1,3}$ | $BL_{2,3}$ | $BL_{3,3}$ | | $B_{0,3}$ | $B_{1,3}$ | $B_{2,3}$ | $B_{3,3}$ | | $BR_{0,3}$ | $BR_{1,3}$ | $BR_{2,3}$ | $BR_{3,3}$ |

SECOND-ORDER ORTHOGONAL SPATIAL INTRA PREDICTION

CROSS-REFERENCE TO RELATED APPLICATIONS

This application is a continuation of U.S. patent application Ser. No. 13/570,497, filed on Aug. 9, 2012, which is incorporated herein by reference in its entirety.

TECHNICAL FIELD

This application relates to video encoding and decoding.

BACKGROUND

Digital video can be used, for example, for remote business meetings via video conferencing, high definition video entertainment, video advertisements, or sharing of user-generated videos. Accordingly, it would be advantageous to provide high resolution video transmitted over communications channels having limited bandwidth.

SUMMARY

Disclosed herein are aspects of systems, methods, and apparatuses for encoding and decoding a video signal.

An aspect of the disclosure is a method for performing second-order orthogonal spatial intra prediction encoding and decoding. Second-order orthogonal spatial intra prediction for a frame of a video stream may include receiving an encoded video stream, identifying a current encoded frame from the encoded video stream, and generating, by a processor in response to instructions stored on a non-transitory computer readable medium, a reconstructed frame by decoding the current encoded frame. Generating the reconstructed frame may include generating a plurality of reconstructed blocks by decoding a portion of the current encoded frame, identifying a current block from the current encoded frame, generating a decoded residual block by decoding the current block, identifying a current pixel location in a current block, identifying a first reconstructed pixel in a first reconstructed block from the plurality of reconstructed blocks, wherein the first reconstructed pixel is at a first oblique angle to the current pixel location, identifying a second reconstructed pixel in a second reconstructed block from the plurality of reconstructed blocks, wherein the second reconstructed pixel is at a second oblique angle to the current pixel location, identifying a third reconstructed pixel in a third reconstructed block from the plurality of reconstructed blocks, wherein the third reconstructed pixel is at least one of at the second oblique angle to the first reconstructed pixel or at the first oblique angle to the second reconstructed pixel, determining a predictor pixel for the current pixel location using a difference between the third reconstructed pixel and a sum of the first reconstructed pixel and the second reconstructed pixel, identifying a reconstructed pixel for the current pixel location as a sum of the predictor pixel and a residual pixel from the decoded residual block corresponding to the current pixel location, and including the reconstructed pixel in an output bitstream.

Another aspect of the disclosure is a method for performing second-order orthogonal spatial intra prediction encoding and decoding. Second-order orthogonal spatial intra prediction for a frame of a video stream may include receiving an input video stream, identifying a current input frame from the input video stream, and generating, by a processor in response to instructions stored on a non-transitory computer readable medium, an encoded frame by encoding the current input frame. Generating the encoded frame may include generating a plurality of reconstructed blocks by encoding a portion of the current input frame, identifying a current block from the current input frame, identifying a current pixel from the current block, identifying a first reconstructed pixel in a first reconstructed block from the plurality of reconstructed blocks, wherein the first reconstructed pixel is at a first oblique angle to the current pixel, identifying a second reconstructed pixel in a second reconstructed block from the plurality of reconstructed blocks, wherein the second reconstructed pixel is at a second oblique angle to the current pixel, identifying a third reconstructed pixel in a third reconstructed block from the plurality of reconstructed blocks, wherein the third reconstructed pixel is at least one of at the second oblique angle to the first reconstructed pixel or at the first oblique angle to the second reconstructed pixel, determining a predictor pixel for the current pixel location using a difference between the third reconstructed pixel and a sum of the first reconstructed pixel and the second reconstructed pixel, generating a residual for the current pixel using a difference between the current pixel and the predictor pixel, and including the residual in an output bitstream.

Another aspect of the disclosure is a method for performing second-order orthogonal spatial intra prediction encoding and decoding. Second-order orthogonal spatial intra prediction for a frame of a video stream may include identifying a current frame from the video stream, and generating, by a processor in response to instructions stored on a non-transitory computer readable medium, a reconstructed frame based on the current frame. Generating the reconstructed frame may include generating a plurality of reconstructed blocks by processing a first portion of the current frame, identifying a current pixel from a current block from a plurality of blocks from a second portion of the current frame, identifying a first reconstructed pixel from a first reconstructed block from the plurality of reconstructed blocks, wherein the first reconstructed pixel is at a first angle to the current pixel, identifying a second reconstructed pixel from a second reconstructed block from the plurality of reconstructed blocks, wherein the second reconstructed pixel is at a second angle to the current pixel, identifying a third reconstructed pixel from a third reconstructed block in the plurality of reconstructed blocks, wherein the third reconstructed pixel is at least one of at the second angle to the first reconstructed pixel or at the first angle to the second reconstructed pixel, and determining a predictor pixel for the current pixel using a difference between the third reconstructed pixel and a sum of the first reconstructed pixel and the second reconstructed pixel.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein:

FIG. 5 is a block diagram of a representation of a frame including blocks in accordance with an implementation of this disclosure;

FIG. 6 is a block diagram of a representation of a frame including blocks including pixels in accordance with an implementation of this disclosure; and FIGS. 7-11 are diagrams of target pixels for second-order orthogonal spatial intra prediction for pixels in a partially decoded frame in accordance with an implementation of this disclosure.

DETAILED DESCRIPTION

Figure 1:
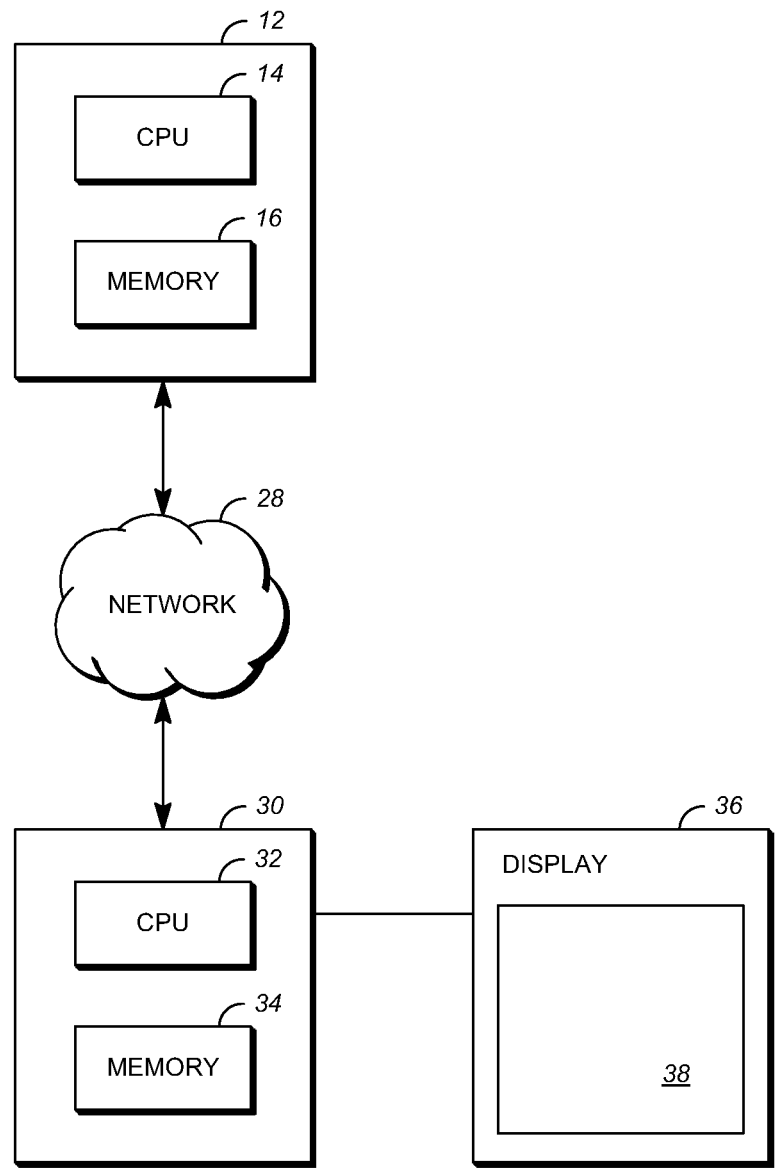
FIG. 1 is a diagram of a video encoding and decoding system in accordance with an implementation of this disclosure.

The generation and display of a video signal, such as high quality digital video communicated using a limited bandwidth medium, can include video compression using one or more video compression schemes, such as VPx or H.264, including present and future versions thereof. Video compression can include second-order orthogonal spatial intra prediction.

Video encoding may include using prediction to generate predicted pixel values in a frame based on similarities between pixels. One form of prediction is TrueMotion prediction which may include predicting a current pixel in a current block using a combination of a pixel in a column of the current pixel and in a block above the current block, a pixel in a row of the current pixel and in a block to the left of the current block, and a pixel in the bottom right corner of a block above and to the left of the current block. TrueMotion prediction may, in some cases, not lead to the best results, such as when applied in scenes with angular similarities. In the disclosed implementations, a pixel may be predicted based on a combination of three proximate decoded pixels in the frame such that the current pixel and the three proximate decoded pixels are orthogonal. This approach can, in some cases, lead to better prediction, such as in cases of angular similarities.

Encoding a video stream, or a portion thereof, such as a frame or a block, can include using temporal and spatial similarities in the video stream to improve coding efficiency. For example, a current block of a video stream may be encoded based on a previously encoded block in the video stream by predicting motion and color information for the current block based on the previously encoded block and identifying a difference (residual) between the predicted values and the current block. Inter prediction can include using a previously encoded block from a previously encoded frame (reference frame). Intra prediction can include using a previously encoded block from the current frame. Intra prediction can be used for encoding, for example, a frame of video or individual images.

Intra prediction can include predicting values for a current block based on values of spatially proximate previously encoded blocks in the current frame which can be identified using one or more intra prediction modes, such as horizontal prediction (H_PRED), vertical prediction (V_PRED), DC prediction (DC_PRED), or TrueMotion prediction (TM_PRED). Horizontal prediction can include filling each column of a current block with a copy of a column to the left of the current block. Vertical prediction can include filling each row of a current block with a copy of a row above the current block. DC prediction can include using a value based on the average of the pixels in a row above a current block and a column to the left of the current block to predict the current block. TrueMotion prediction can include using a value based on the pixels in a row above a current block and a column to the left of the current block to predict the current block in combination with the pixel above and to the left of the block. Horizontal differences between pixels in the row above the current block can be propagated using the pixels from the column to the left of the current block to start each row.

Horizontal prediction may be used to predict pixel values based on horizontal similarities between pixels. Vertical prediction may be used to predict pixel values based on vertical similarities between pixels. DC prediction or TrueMotion prediction may be used to predict pixel values based on horizontal and vertical similarities between pixels. However, the predictive capability of horizontal prediction, vertical prediction, DC prediction, and TrueMotion prediction for angular similarities may be suboptimal.

In an implementation, intra prediction can include using second-order orthogonal spatial intra prediction as the intra prediction mode. Second-order orthogonal spatial intra prediction can include predicting a value for a current pixel in a current block of a current frame based on a combination of three proximate decoded pixels in the frame such that the current pixel and the three proximate decoded pixels are orthogonal.

FIG. 1 is a diagram of a video encoding and decoding system 10 in accordance with an implementation of this disclosure. A transmitting station 12 can be, for example, a computing device having an internal configuration of hardware including a processor such as a central processing unit (CPU) 14 and a memory 16. The CPU 14 can be a controller for controlling the operations of the transmitting station 12. The CPU 14 can be connected to the memory 16 by, for example, a memory bus. The memory 16 can be read only memory (ROM), random access memory (RAM), or any other suitable memory device. The memory 16 can store data and program instructions which can be used by the CPU 14. Other suitable implementations of the transmitting station 12 are possible. As used herein, the term "computing device" includes a server, a hand-held device, a laptop computer, a desktop computer, a special purpose computer, a general purpose computer, or any device, or combination of devices, capable of performing any method, or any portion thereof, disclosed herein.

A network 28 can connect the transmitting station 12 and a receiving station 30 for encoding and decoding of the video stream. Specifically, the video stream can be encoded in the transmitting station 12 and the encoded video stream can be decoded in the receiving station 30. The network 28 can, for example, be the Internet. The network 28 can also be a local area network (LAN), wide area network (WAN), virtual private network (VPN), a mobile or cellular telephone network, or any other means of transferring the video stream from the transmitting station 12 to, in this example, receiving station 30.

The receiving station 30, in one example, can be a computing device having an internal configuration of hardware including a processor such as a central processing unit (CPU) 32 and a memory 34. The CPU 32 may be a controller for controlling the operations of the receiving station 30. The CPU 32 can be connected to the memory 34 by, for example, a memory bus. The memory 34 can be ROM, RAM or any other suitable memory device. The memory 34 can store data and program instructions can be used by the CPU 32. Other suitable implementations of receiving station 30 are possible. For example, the processing of the receiving station 30 can be distributed among multiple devices.

A display 36 configured to display a video stream can be connected to the receiving station 30. The display 36 can be implemented in various ways, including by a liquid crystal display (LCD), a cathode-ray tube (CRT), or a light emitting diode display (LED), such as an OLED display. The display 36 can be coupled to CPU 32 and can be configured to display a rendering 38 of the video stream decoded by a decoder in receiving station 30.

Other implementations of the video encoding and decoding system 10 are possible. For example, an implementation can omit the network 28, the display 36, or both. In an implementation, a video stream can be encoded and stored for transmission at a later time by the receiving station 30 or any other device having memory. In an implementation, the receiving station 30 can receive (e.g., via network 28, a computer bus, and/or some communication pathway) the encoded video stream and can store the video stream for later decoding. In another implementation, additional components can be added to the video encoding and decoding system 10. For example, a display or a video camera can be attached to the transmitting station 12 to capture the video stream to be encoded. In an implementation, a real-time transport protocol (RTP) is used for transmission. In another implementation, a transport protocol other than RTP may be used, e.g. a Hyper Text Transport Protocol (HTTP)-based video streaming protocol.

Figure 2:
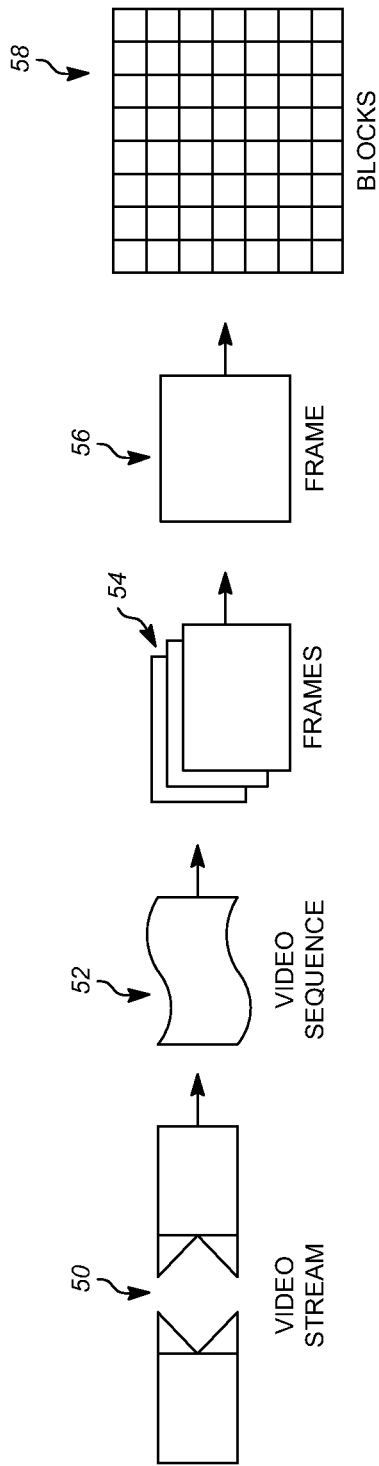
FIG. 2 is a diagram of a typical video stream for encoding and decoding in accordance with an implementation of this disclosure.

FIG. 2 is a diagram of a video stream 50 for encoding and decoding in accordance with an implementation of this disclosure. video stream 50 includes a video sequence 52. At the next level, the video sequence 52 includes a number of adjacent frames 54. While three frames are depicted in adjacent frames 54, the video sequence 52 can include any number of adjacent frames. The adjacent frames 54 can then be further subdivided into a single frame 56. At the next level, the single frame 56 can be divided into a series of blocks 58. Although not shown in FIG. 2, a block 58 can include pixels. For example, a block can include a 16×16 group of pixels, an 8×8 group of pixels, an 8×16 group of pixels, or any other group of pixels. Unless otherwise indicated herein, the term 'block' can include a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 3:
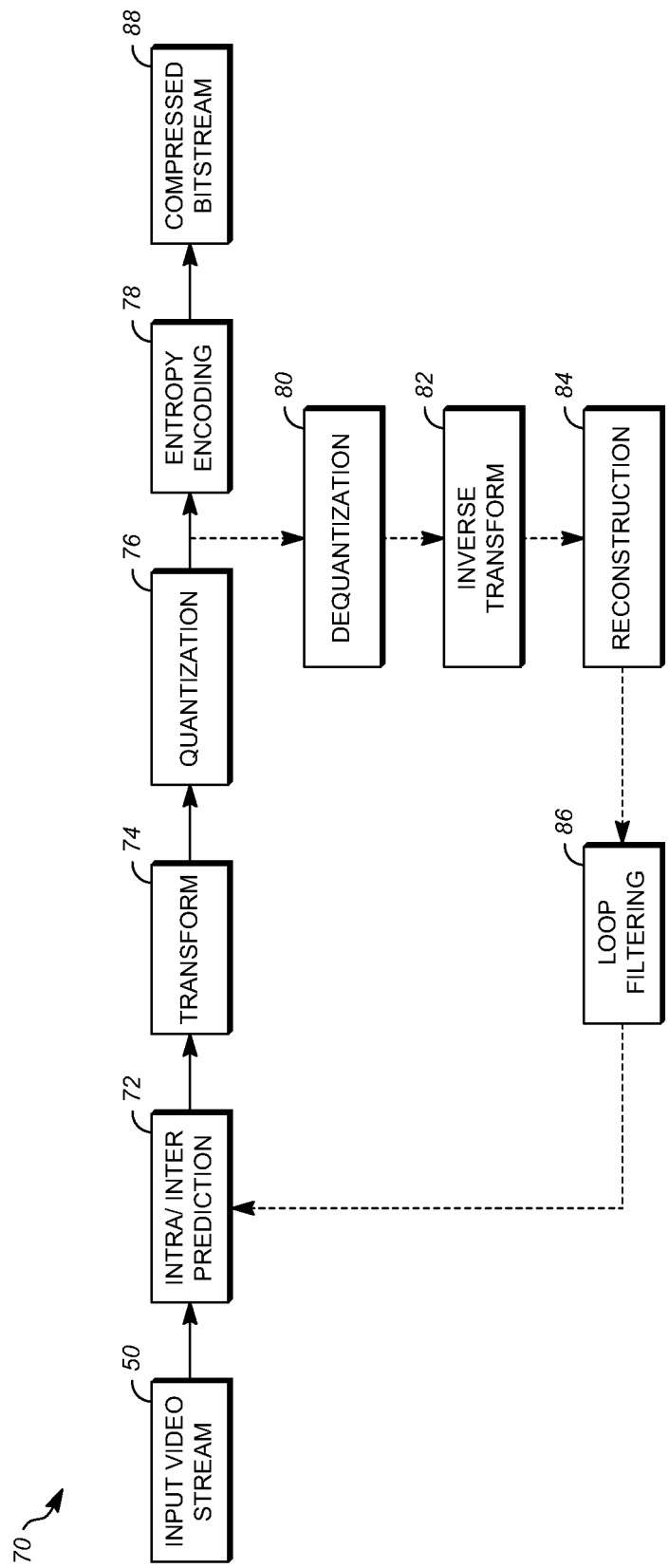
FIG. 3 is a block diagram of a video compression device in accordance with an implementation of this disclosure.

FIG. 3 is a block diagram of an encoder 70 in accordance with an implementation of this disclosure. Encoder 70 can be implemented, as described above, in the transmitting station 12 as a computer software program stored in memory 16, for example. The computer software program can include machine instructions that, when executed by CPU 14, cause transmitting station 12 to encode video data in the manner described in FIG. 3. Encoder 70 can be implemented as specialized hardware included, for example, in transmitting station 12. Encoder 70 can be implemented as specialized hardware included, for example, in transmitting station 12. The encoder 70 can encode an input video stream 50. The encoder 70 may have the following stages to perform the various functions in a forward path (shown by the solid connection lines) to produce an encoded or a compressed bitstream 88: an intra/inter prediction stage 72, a transform stage 74, a quantization stage 76, and an entropy encoding stage 78. The encoder 70 can include a reconstruction path (shown by the dotted connection lines) to reconstruct a frame for encoding of further blocks. The encoder 70 may have the following stages to perform the various functions in the reconstruction path: a dequantization stage 80, an inverse transform stage 82, a reconstruction stage 84, and a loop filtering stage 86. Other structural variations of the encoder 70 can be used to encode the video stream 50.

When the video stream 50 is presented for encoding, each frame 56 within the video stream 50 can be processed in units of blocks. At the intra/inter prediction stage 72, each block can be encoded using either intra-frame prediction, which may be within a single frame, or inter-frame prediction, which may be from frame to frame. In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at the intra/inter prediction stage 72 to produce a residual block. The transform stage 74 transforms the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values may be based on spatial frequency, with the lowest frequency (i.e. DC) coefficient at the top-left of the matrix and the highest frequency coefficient at the bottom-right of the matrix.

The quantization stage 76 can convert the transform coefficients into discrete quantum values, which may be referred to as quantized transform coefficients or quantization levels. The quantized transform coefficients can be entropy encoded by the entropy encoding stage 78. Entropy encoding can include using a probability distribution metric. The entropy-encoded coefficients, together with the information used to decode the block, which may include the type of prediction used, motion vectors, and quantizer value, can be output to the compressed bitstream 88. The compressed bitstream 88 can be formatted using various techniques, such as run-length encoding (RLE) and zero-run coding.

The reconstruction path in FIG. 3 (shown by the dotted connection lines) can be used to help provide that both the encoder 70 and a decoder 100 (described below) with the same reference frames to decode the compressed bitstream 88. The reconstruction path can perform functions that are similar to functions that take place during the decoding process that are discussed in more detail below, including dequantizing the quantized transform coefficients at the dequantization stage 80 and inverse transforming the dequantized transform coefficients at the inverse transform stage 82 to produce a derivative residual block. At the reconstruction stage 84, the prediction block that was predicted at the intra/inter prediction stage 72 can be added to the derivative residual block to create a reconstructed block. The loop filtering stage 86 can be applied to the reconstructed block to reduce distortion such as blocking artifacts.

Other variations of the encoder 70 can be used to encode the compressed bitstream 88. For example, a non-transform based encoder 70 can quantize the residual block directly without the transform stage 74. In another implementation, an encoder 70 can have the quantization stage 76 and the dequantization stage 80 combined into a single stage.

Figure 4:
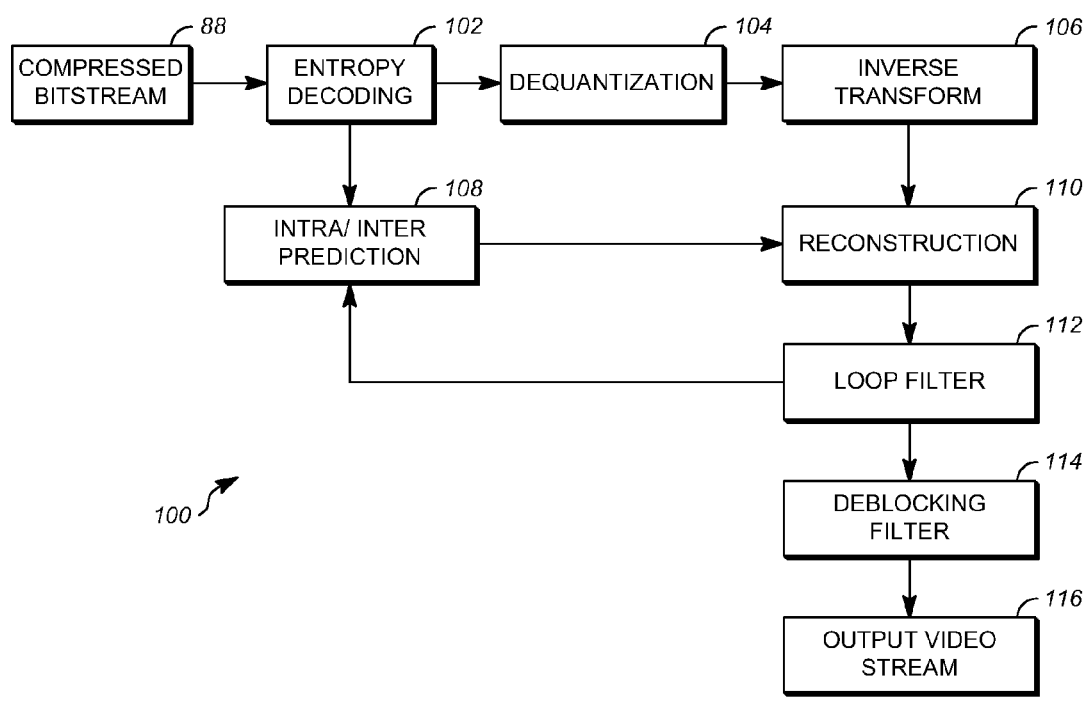
FIG. 4 is a block diagram of a video decompression device in accordance with an implementation of this disclosure.

FIG. 4 is a block diagram of a decoder 100 in accordance with an implementation of this disclosure. The decoder 100 can be implemented in a device, such as the receiving station 30 described above, for example, using a computer software program stored in memory 34. The computer software program can include machine instructions that, when executed by CPU 32, cause receiving station 30 to decode video data in the manner described in FIG. 4. Decoder 100 can also be implemented as specialized hardware included, for example, in transmitting station 12 or receiving station 30.

The decoder 100, may be similar to the reconstruction path of the encoder 70 discussed above, and can include, in one example, the following stages to perform various functions to produce an output video stream 116 from the compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of the decoder 100 can be used to decode the compressed bitstream 88.

When the compressed bitstream 88 is presented for decoding, the data elements within the compressed bitstream 88 can be decoded by the entropy decoding stage 102 (using, for example, Context Adaptive Binary Arithmetic Decoding) to produce a set of quantized transform coefficients. The dequantization stage 104 can dequantize the quantized transform coefficients, and the inverse transform stage 106 can inverse transform the dequantized transform coefficients to produce a derivative residual block that can be identical to that created by the inverse transformation stage 84 in the encoder 70. Using header information decoded from the compressed bitstream 88, the decoder 100 can use the intra/inter prediction stage 108 to create the same prediction block as was created in the encoder 70. At the reconstruction stage 110, the prediction block can be added to the derivative residual block to create a reconstructed block. The loop filtering stage 112 can be applied to the reconstructed block to reduce blocking artifacts. The deblocking filtering stage 114 can be applied to the reconstructed block to reduce blocking distortion, and the result is output as the output video stream 116.

Other variations of the decoder 100 can be used to decode the compressed bitstream 88. For example, the decoder 100 can produce the output video stream 116 without the deblocking filtering stage 114.

FIGS. 5-11 show examples of representations of a frame, such as frame 56 shown in FIG. 2. Although second-order orthogonal spatial intra prediction is described herein with reference to matrix or Cartesian representation of a frame for clarity, a frame may be stored, transmitted, processed, or any combination thereof, in any data structure such that pixel values may be efficiently predicted for a frame or image including angular similarities between pixels. For example, a frame may be stored, transmitted, processed, or any combination thereof, in a two dimensional data structure such as a matrix as shown, or in a one dimensional data structure, such as a vector array. In an implementation, a representation of the frame, such as a two dimensional representation as shown, may correspond to a physical location in a rendering of the frame as an image. For example, a pixel in the top left corner of a block in the top left corner of the frame may correspond with a physical pixel in the top left corner of a rendering of the frame as an image.

As used herein, the term "angular similarities" may indicate similarities in an image, such as similarities that are not horizontal similarities or vertical similarities, which may not be efficiently estimated using linear prediction modes, such as vertical prediction, horizontal prediction, DC prediction, or TrueMotion prediction. As used herein the term "axis" may indicate an axis of a representation of a frame or block in the frame, such as an x-axis which may correspond to one or more rows or a y-axis which may correspond to one or more columns. As used herein, the term "orthogonal" may indicate, for example, respective elements (pixels) oriented such that the elements are equidistant from an intersection of vectors between the elements and the angles between each pair of adjacent elements are congruent. In some implementations the term "orthogonal" may include the term "nearly orthogonal" which may indicate that that the respective elements (pixels) are oriented such that the elements are close to orthogonal. For example, a prospective set of four orthogonal elements may include three available elements and one unavailable element, and a corresponding set of four nearly orthogonal elements may include the three available elements in the prospective set of orthogonal elements and a fourth available element that is in the closest available element to the unavailable element.

FIG. 5 is a block diagram of a representation of a frame including blocks in accordance with an implementation of this disclosure. As shown, the frame includes nine blocks represented in three rows and three columns in a matrix or Cartesian plane. A location for each block in the representation may be identified using a row value I and a column value J. For example, the block in the top left corner of the frame may be identified using a row value of zero and a column value of zero, which may be expressed as $BLOCK_{0,0}$.

For clarity, the blocks in the frame may be identified based on the location relative to a current block in the frame. For example, as shown in FIG. 5, a current block $BLOCK_{1,1}$ may be identified with an X, a block on top of X may be identified with a T, a block to the left of T may be identified with a TL, a block to the right of T may be identified with a TR, a block to the left of X may be identified with an L, a block to the right of X may be identified with an R, a block below X may be identified with a B, a block to the left of B may be identified with a BL, and a block to the right of B may be identified with a BR.

FIG. 6 is a block diagram of a representation of a frame including blocks including pixels in accordance with an implementation of this disclosure. For example, as shown, each block may include 16 pixels which may be represented in four rows and four columns in each respective block in the Cartesian plane or matrix. A location for each pixel in the representation may be identified using a block identifier, a row value i, and a column value j. For example, a pixel in the top right corner of the top right block may be identified as $TR_{3,0}$. In FIG. 6 the blocks are shown with space between them for clarity and may not correspond with any physical space in an image represented by the representation.

In an implementation, second-order orthogonal spatial intra prediction encoding, or any portion thereof, can be implemented in a device, such as the transmitting station 12 shown in FIG. 1. For example, an encoder, such as the encoder 70 shown in FIG. 3, can implement second-order orthogonal spatial intra prediction encoding, or any portion thereof, using instruction stored on a tangible, non-transitory, computer readable media, such as memory 34 shown in FIG. 1. In an implementation, the encoder may identify second-order orthogonal spatial intra prediction as the prediction mode for encoding a block, may predict values for each pixel in the block as described herein, and may calculate a residual error (ResErr) for each pixel based on a difference between the value of the current pixel ($Cur_{i,j}$) and the corresponding predicted pixel ($Pred_{i,j}$). For example, for a 4×4 block of pixels, such as those shown in FIG. 6, the residual error may be expressed as $ResErr_{i,j}=Cur_{i,j}-Pred_{i,j}$ where i=0, 1, 2, 3 and j=0, 1, 2, 3. The encoder may generate an encoded video stream based on the prediction mode and the generated residual error values. For example, the encoder may transform, quantize, and entropy encode the prediction mode and residual error values.

In an implementation, second-order orthogonal spatial intra prediction decoding, or any portion thereof, can be implemented in a device, such as the receiving station 30 shown in FIG. 1. For example, a decoder, such as the decoder 100 shown in FIG. 3, can implement second-order orthogonal spatial intra prediction decoding, or any portion thereof, using instruction stored on a tangible, non-transitory, computer readable media, such as memory 34 shown in FIG. 1. In an implementation, the decoder may receive an encoded video stream and may identify the prediction mode and the residual errors from the encoded video stream. For example, the decoder may entropy decode, dequantize, and inverse transform the encoded video stream as shown in FIG. 4. The decoder may predict values for each pixel in the block as described herein, and may generate a reconstructed video stream based on the predicted values and the residual errors.

FIGS. 7-11 show examples of second-order orthogonal spatial intra prediction of a partially decoded frame. For example, a decoder, such as decoder 100 shown in FIG. 4, may be decoding the frame, the blocks TL, T, TR, and L may be processed blocks, such as decoded blocks, the blocks X, R, BL, B, and BR may be unprocessed blocks, such as encoded blocks that have not yet been decoded, and the block X may be the current block for processing, such as decoding. Although FIGS. 7-11 are shown with reference to second-order orthogonal spatial intra prediction for decoding, second-order orthogonal spatial intra prediction may be used for encoding. For example, an encoder, such as encoder 70 shown in FIG. 4, may be encoding the frame, the blocks TL, T, TR, and L may be reconstructed blocks processed by the reconstruction path of encoder 70, the blocks X, R, BL, B, and BR may be blocks that have not been encoded, and the block X may be the current block for encoding. Although FIGS. 7-11 show examples of second-order orthogonal spatial intra prediction for an angle, any other angle may be used.

Implementations of second-order orthogonal spatial intra prediction may include generating a predictor pixel ($Pred_{i,j}=Pred_{0,0}$) for a current pixel ($Cur_{i,j}=X_{0,0}$) in a current block X of a frame based on a combination of three proximate target pixels ($P_A$, $P_B$, and $P_C$), which may be decoded pixels in one or more other decoded blocks in the frame, such that the current pixel $X_{0,0}$ and the three proximate target pixels $P_{A-C}$ are orthogonal. For example, the first decoded pixel $P_A$ may be identified in a block of the frame such that a vector from the current pixel $X_{0,0}$ to the first decoded pixel $P_A$ forms an oblique angle ($ANGLE_A$) with an axis of the frame, such as a row or column of the current pixel; the second decoded pixel $P_B$ may be identified in a block of the frame such that a vector from the current pixel $X_{0,0}$ to the second decoded pixel $P_B$ forms another oblique angle ($ANGLE_B$) with the axis of the frame; and the third decoded pixel $P_C$ may be identified in a block of the frame such that the current pixel $X_{0,0}$, the first decoded pixel $P_A$, the second decoded pixel $P_B$, and the third decoded pixel $P_C$ are orthogonal. For example, a vector from the first decoded pixel $P_A$ to the third decoded pixel $P_C$ may form $ANGLE_B$, a vector from the second decoded pixel $P_B$ to the third decoded pixel $P_C$ may form $ANGLE_A$, or a vector from the first decoded pixel $P_A$ to the third decoded pixel $P_C$ may form $ANGLE_B$ and a vector from the second decoded pixel $P_B$ to the third decoded pixel $P_C$ may form $ANGLE_A$. The first oblique angle $ANGLE_A$ and the second oblique angle $ANGLE_B$ may be supplementary angles, such that the sum of $ANGLE_A$ and $ANGLE_B$ is 180°, or conjugate angles, such that the sum of $ANGLE_A$ and $ANGLE_B$ is 360°.

In an implementation, a frame may include a plurality of candidate pixels that may be used as the respective decoded pixels $P_{A-C}$. For example, a frame may include a first decoded pixel $P_A$ at a first oblique angle $ANGLE_A$, a first candidate pixel at a second oblique angle $ANGLE_B$ that is supplementary to the first oblique angle $ANGLE_A$, and a second candidate pixel at a third oblique angle $ANGLE_C$ such that the first oblique angle $ANGLE_A$ and the third oblique angle $ANGLE_C$ are conjugate angles. A vector from the current pixel $Cur_{i,j}$ to the first candidate pixel may be collinear with a vector from the current pixel $Cur_{i,j}$ to the second candidate pixel. Second-order orthogonal spatial intra prediction may include determining whether to use the first candidate pixel or the second candidate pixel as the second decoded pixel $P_B$. In another example, a frame may include a first decoded pixel $P_A$ at a first oblique angle $ANGLE_A$, a second decoded pixel $P_B$ at a second oblique angle $ANGLE_B$, a first candidate pixel at the second oblique angle $ANGLE_B$ to the first decoded pixel $P_A$, and a second candidate pixel at the first oblique angle $ANGLE_A$ to the second decoded pixel $P_B$. Second-order orthogonal spatial intra prediction may include determining whether to use the first candidate pixel or the second candidate pixel as the third decoded pixel $P_C$.

In an implementation, one or more of the target pixels $P_{A-C}$ may not be available in the frame and a predictor pixel may be generated based on another prediction mode or on one or more alternate pixel values. For example, the current pixel $Cur_{i,j}$ may be a pixel in the top left block in the frame ($BLOCK_{0,0}$), the frame may not include decoded pixels in other blocks in the frame, and the predictor pixel $Pred_{i,j}$ for the current pixel $Cur_{i,j}$ may be generated using another prediction mode, such as DC_PRED, or using one or more alternate pixel values, such as values in a defined matrix. In another example, such as the example shown in FIG. 11, the frame may not include a target pixel, and a decoded pixel in close proximity to the target pixel may be used.

FIGS. 7-11 show examples of decoded pixel locations for determining respective predictor pixels wherein $ANGLE_A$ is shown as 135°; however, a predictor pixel may be determined using other decoded pixels. For example, the first decoded pixel $P_A$ may be identified at an oblique angle $ANGLE_A$=45°; the second decoded pixel $P_B$ may be identified at another oblique angle $ANGLE_B$, which may be supplementary to the first oblique angle $ANGLE_A$, such as 135°; and the third decoded pixel $P_C$ may be identified such that the current pixel $X_{0,0}$ and the decoded pixels $P_{A-C}$ are orthogonal. In an implementation, $ANGLE_B$ may be an angle that is not supplementary to $ANGLE_A$.

Figure 7:
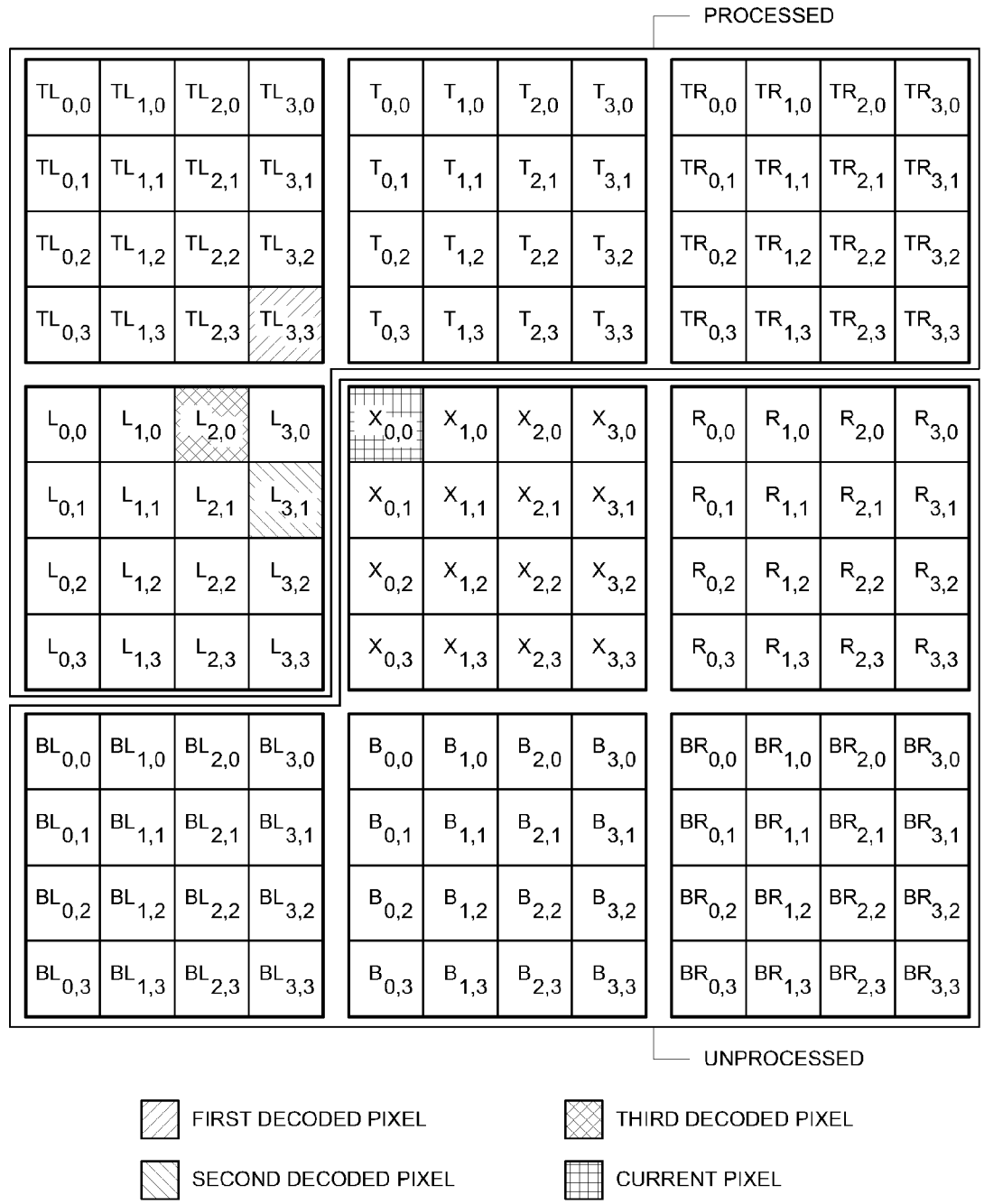

FIG. 7 shows an example of second-order orthogonal spatial intra prediction for decoding a current pixel $X_{0,0}$ in a current block X of a partially decoded frame. As shown, a predictor pixel for the current pixel $X_{0,0}$ may be determined using a pixel value of a first decoded pixel $P_A=TL_{3,3}$, a pixel value of a second decoded pixel $P_B=L_{3,1}$, and a pixel value of a third decoded pixel $P_C=L_{2,0}$. Determining the predictor pixel may be expressed as $X_{0,0}=TL_{3,3}+L_{3,1}-L_{2,0}$.

The first decoded pixel $P_A$ may be identified at a first oblique angle $ANGLE_A$ to the current pixel $X_{0,0}$, such as 135° as shown. The first decoded pixel $P_A$ may be the closest decoded pixel to the current pixel $X_{0,0}$ in the frame at the first oblique angle $ANGLE_A$. The second decoded pixel $P_B$ may be identified at a second oblique angle $ANGLE_B$ to the current pixel, such as 225° as shown. The second decoded pixel $P_B$ may be the closest decoded pixel to the current pixel $X_{0,0}$ in the frame at the second oblique angle $ANGLE_B$.

The current pixel $X_{0,0}$, the first decoded pixel $P_A$, the second decoded pixel $P_B$, and the third decoded pixel $P_C$ may be orthogonal such that a vector from the first decoded pixel $P_A$ to the third decoded pixel $P_C$ may form $ANGLE_B$, a vector from the second decoded pixel $P_B$ to the third decoded pixel $P_C$ may form $ANGLE_A$, or a vector from the first decoded pixel $P_A$ to the third pixel $P_C$ may form $ANGLE_B$ and a vector from the second decoded pixel $P_B$ to the third decoded pixel $P_C$ may form $ANGLE_A$.

Although not shown in FIG. 7, a predictor pixel for another current pixel $X_{0,1}$ may be determined using a pixel value of a first decoded pixel $P_A=L_{3,0}$, a pixel value of a second decoded pixel $P_B=L_{3,2}$, and a pixel value of a third decoded pixel $P_C=L_{2,1}$, which may be expressed as $X_{0,1}=L_{3,0}+L_{3,2}-L_{2,1}$. A predictor pixel for another current pixel $X_{0,2}$ may be determined using a pixel value of a first decoded pixel $P_A=L_{3,1}$, a pixel value of a second decoded pixel $P_B=L_{3,3}$, and a pixel value of a third decoded pixel $P_C=L_{2,2}$, which may be expressed as $X_{0,2}=L_{3,1}+L_{3,3}-L_{2,2}$.

Figure 8:
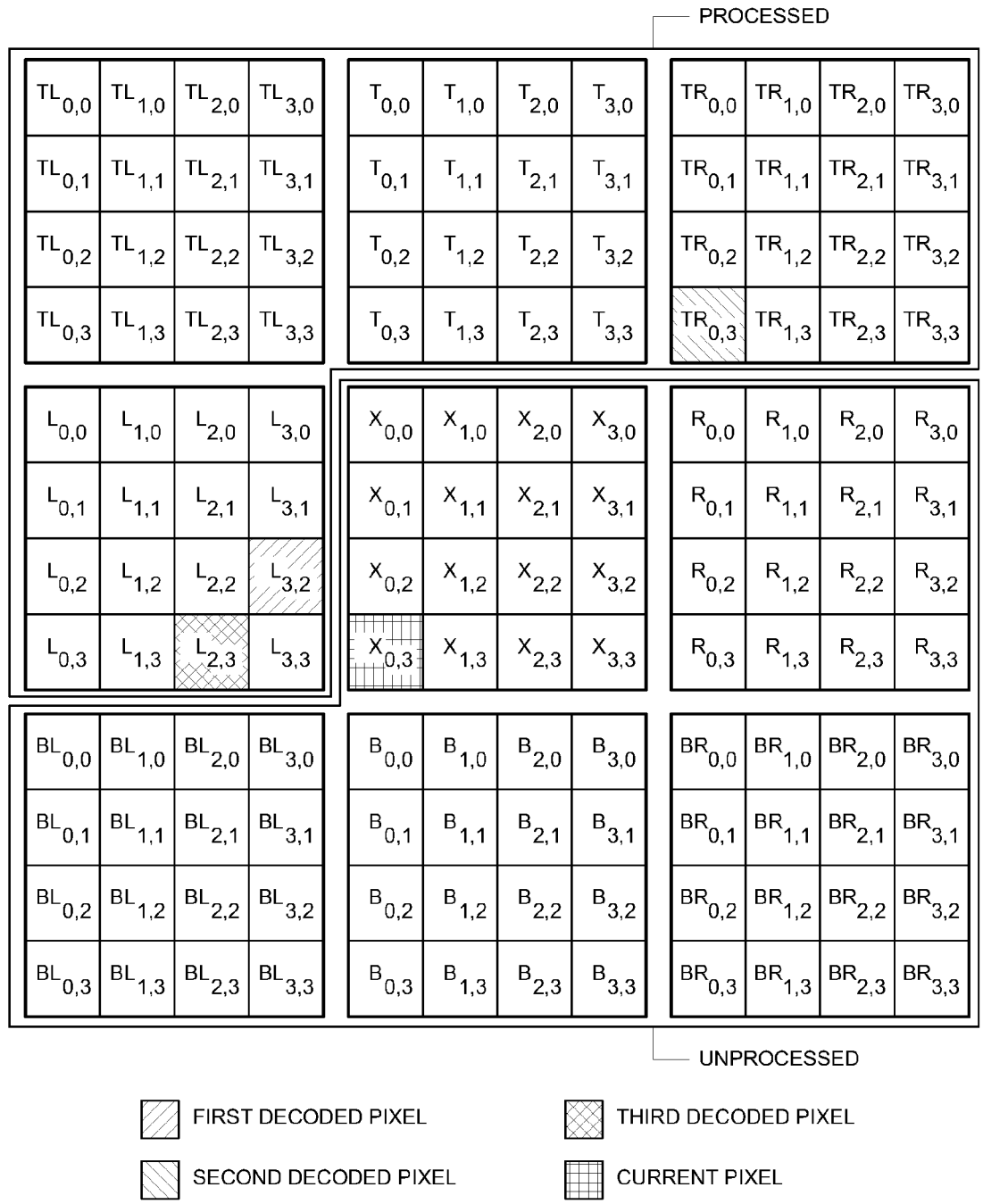

FIG. 8 shows an example of second-order orthogonal spatial intra prediction for decoding another current pixel $X_{0,3}$ in a current block X of a partially decoded frame. As shown, a predictor pixel for the current pixel $X_{0,3}$ may be determined using a pixel value of a first decoded pixel $P_A=L_{3,2}$, a pixel value of a second decoded pixel $P_B=TR_{0,3}$, and a pixel value of a third decoded pixel $P_C=L_{2,3}$. Determining the predictor pixel may be expressed as $X_{0,3}=L_{3,2}+TR_{0,3}-L_{2,3}$.

The first decoded pixel $P_A$ may be identified at a first oblique angle $ANGLE_A$ to the current pixel $X_{0,3}$, such as 135° as shown. The first decoded pixel $P_A$ may be the closest decoded pixel to the current pixel $X_{0,3}$ in the frame at the first oblique angle $ANGLE_A$.

A decoded pixel may not be available at the second oblique angle $ANGLE_B$ (225°) shown in FIGS. 7-8 and the second decoded pixel $P_B$ may be identified at an oblique angle $ANGLE_C$, such as 45° as shown, that is supplementary to the first oblique angle $ANGLE_A$, such that a vector from the current pixel $X_{0,3}$ to the second decoded pixel $P_B$ may be collinear with a vector from the current pixel $X_{0,3}$ to a pixel at the second oblique angle $ANGLE_B$, such as $BL_{3,0}$. The second decoded pixel $P_B$ may be the closest decoded pixel to the current pixel $X_{0,3}$ in the frame at the second oblique angle $ANGLE_B$ or at the supplementary oblique angle $ANGLE_C$.

The current pixel $X_{0,3}$, the first decoded pixel $P_A$, the second decoded pixel $P_B$, and the third decoded pixel $P_C$ may be identified such that a vector from the first decoded pixel $P_A$ to the third pixel $P_C$ may form $ANGLE_B$, a vector from the second decoded pixel $P_B$ to the third decoded pixel $P_C$ may form $ANGLE_A$, or a vector from the first decoded pixel $P_A$ to the third pixel $P_C$ may form $ANGLE_B$ and a vector from the second decoded pixel $P_B$ to the third decoded pixel $P_C$ may form $ANGLE_A$.

The current pixel $X_{0,3}$, the first decoded pixel $P_A$, the second decoded pixel $P_B$, and the third decoded pixel $P_C$ may be nearly orthogonal. For example, the pixels $X_{0,3}$, $L_{3,2}$, $BL_{3,0}$, and $L_{2,3}$ may be orthogonal; however, as shown, $BL_{3,0}$ may not be a decoded pixel and $TR_{0,3}$, which may be collinear with $BL_{3,0}$, may be identified as the second decoded pixel $P_B$. The pixels $X_{0,3}$, $L_{3,2}$, $TR_{0,3}$, and $L_{2,3}$ may be referred to as nearly orthogonal.

Figure 9:
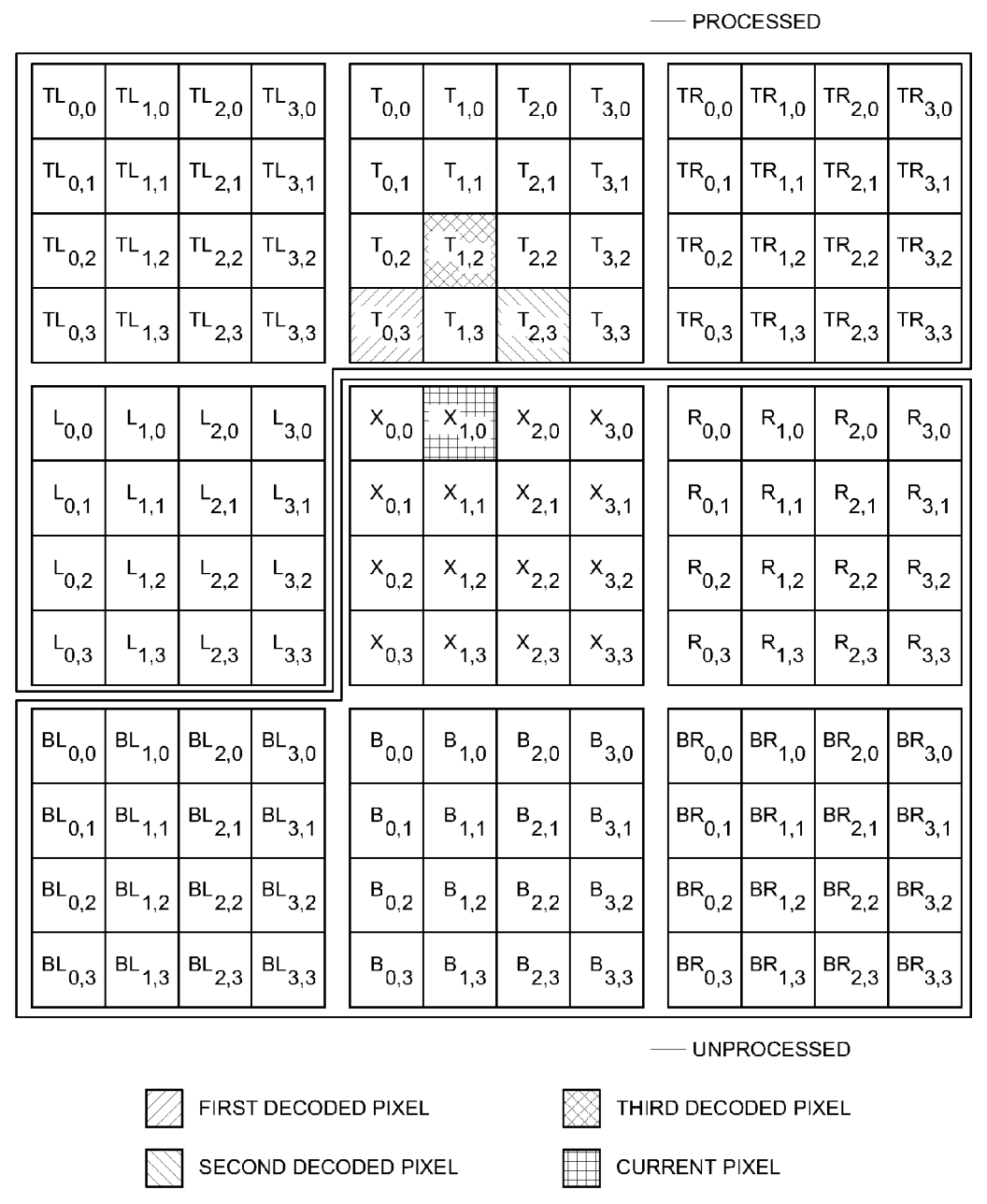

FIG. 9 shows an example of second-order orthogonal spatial intra prediction for decoding another current pixel $X_{1,0}$ in a current block X of a partially decoded frame. As shown, a predictor pixel for the current pixel $X_{1,0}$ may be determined using a pixel value of a first decoded pixel $P_A=T_{0,3}$, a pixel value of a second decoded pixel $P_B=T_{2,3}$, and a pixel value of a third decoded pixel $P_C=T_{1,2}$. Determining the predictor pixel may be expressed as $X_{1,0}=T_{0,3}+T_{2,3}-T_{1,2}$.

The first decoded pixel $P_A$ may be identified at a first oblique angle $ANGLE_A$ to the current pixel $X_{1,0}$, such as 135° as shown. The first decoded pixel $P_A$ may be the closest decoded pixel to the current pixel $X_{1,0}$ in the frame at the first oblique angle $ANGLE_A$. The second decoded pixel $P_B$ may be identified at a second oblique angle $ANGLE_B$ to the current pixel $X_{1,0}$, such as 45° as shown. The second decoded pixel $P_B$ may be the closest decoded pixel to the current pixel $X_{1,0}$ in the frame at the second oblique angle $ANGLE_B$.

The current pixel $X_{1,0}$, the first decoded pixel $P_A$, the second decoded pixel $P_B$, and the third decoded pixel $P_C$ may be orthogonal, such that a vector from the first decoded pixel $P_A$ to the third pixel $P_C$ may form $ANGLE_B$, a vector from the second decoded pixel $P_B$ to the third decoded pixel $P_C$ may form $ANGLE_A$, or a vector from the first decoded pixel $P_A$ to the third pixel $P_C$ may form $ANGLE_B$ and a vector from the second decoded pixel $P_B$ to the third decoded pixel $P_C$ may form $ANGLE_A$.

Although not shown in FIG. 9, a predictor pixel for another current pixel $X_{1,1}$ may be determined using a pixel value of a first decoded pixel $P_A=TL_{3,3}$, a pixel value of a second decoded pixel $P_B=T_{3,3}$, and a pixel value of a third decoded pixel $P_C=T_{1,1}$, which may be expressed as $X_{1,1}=TL_{3,3}+T_{3,3}-T_{1,1}$. A predictor pixel for another current pixel $X_{1,2}$ may be determined using a pixel value of a first decoded pixel $P_A=L_{3,0}$, a pixel value of a second decoded pixel $P_B=TR_{0,3}$, and a pixel value of a third decoded pixel $P_C=T_{2,1}$, which may be expressed as $X_{1,2}=L_{3,0}+TR_{0,3}-T_{2,1}$. Although not shown in FIG. 9, a predictor pixel for another current pixel $X_{1,3}$ may be determined using a pixel value of a first decoded pixel $P_A=L_{3,1}$, a pixel value of a second decoded pixel $P_B=TR_{1,3}$, and a pixel value of a third decoded pixel $P_C=T_{3,1}$, which may be expressed as $X_{1,3}=L_{3,1}+TR_{1,3}-T_{3,1}$. A predictor pixel for another current pixel $X_{2,0}$ may be determined using a pixel value of a first decoded pixel $P_A=T_{1,3}$, a pixel value of a second decoded pixel $P_B=T_{3,3}$, and a pixel value of a third decoded pixel $P_C=T_{2,2}$, which may be expressed as $X_{2,0}=T_{1,3}+T_{3,3}-T_{2,2}$. A predictor pixel for another current pixel $X_{2,1}$ may be determined using a pixel value of a first decoded pixel $P_A=T_{0,3}$, a pixel value of a second decoded pixel $P_B=TR_{0,3}$, and a pixel value of a third decoded pixel $P_C=T_{2,1}$, which may be expressed as $X_{2,1}=T_{0,3}+TR_{0,3}-T_{2,1}$. A predictor pixel for another current pixel $X_{2,2}$ may be determined using a pixel value of a first decoded pixel $P_A=TL_{3,3}$, a pixel value of a second decoded pixel $P_B=TR_{1,3}$, and a pixel value of a third decoded pixel $P_C=T_{2,0}$, which may be expressed as $X_{2,2}=TL_{3,3}+TR_{1,3}-T_{2,0}$.

Figure 10:
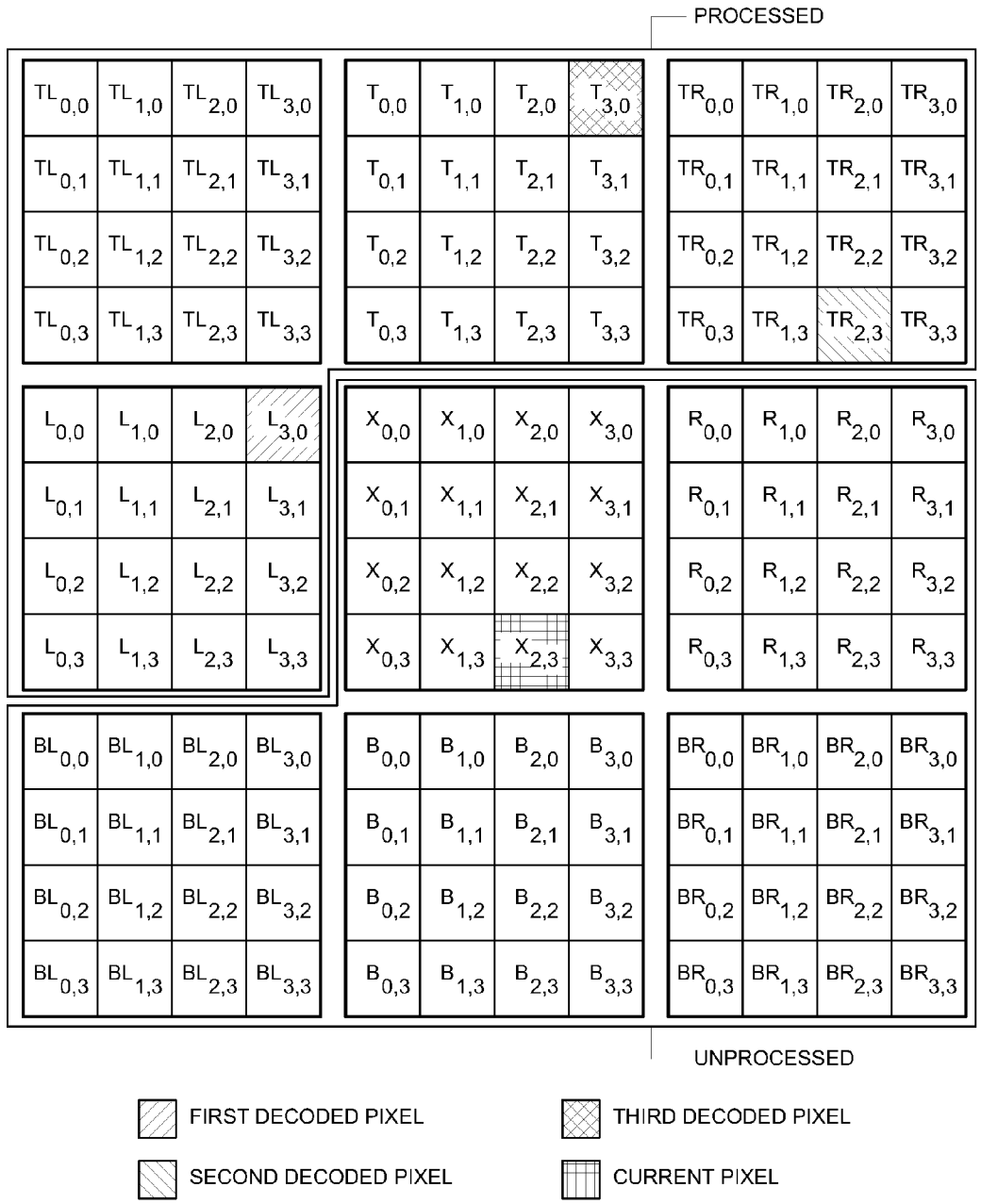

FIG. 10 shows an example of second-order orthogonal spatial intra prediction for decoding another current pixel $X_{2,3}$ in a current block X of a partially decoded frame. As shown, a predictor pixel for the current pixel $X_{2,3}$ may be determined using a pixel value of a first decoded pixel $P_A=L_{3,0}$, a pixel value of a second decoded pixel $P_B=TR_{2,3}$, and a pixel value of a third decoded pixel $P_C=T_{3,0}$. Determining the predictor pixel may be expressed as $X_{2,3}=TL_{3,3}+TR_{1,3}-T_{2,0}$.

The first decoded pixel $P_A$ may be identified at a first oblique angle $ANGLE_A$ to the current pixel $X_{2,3}$, such as 135° as shown. The first decoded pixel $P_A$ may be the closest decoded pixel to the current pixel $X_{2,3}$ in the frame at the first oblique angle $ANGLE_A$. The second decoded pixel $P_B$ may be identified at a second oblique angle $ANGLE_B$ to the current pixel $X_{2,3}$, such as 45° as shown. The second decoded pixel $P_B$ may be the closest decoded pixel to the current pixel $X_{2,3}$ in the frame at the second oblique angle $ANGLE_B$.

The current pixel $X_{2,3}$, the first decoded pixel $P_A$, the second decoded pixel $P_B$, and the third decoded pixel $P_C$ may be orthogonal, such that a vector from the first decoded pixel $P_A$ to the third pixel $P_C$ may form $ANGLE_B$, a vector from the second decoded pixel $P_B$ to the third decoded pixel $P_C$ may form $ANGLE_A$, or a vector from the first decoded pixel $P_A$ to the third pixel $P_C$ may form $ANGLE_B$ and a vector from the second decoded pixel $P_B$ to the third decoded pixel $P_C$ may form $ANGLE_A$.

Although not shown in FIG. 10, a predictor pixel for another current pixel $X_{3,0}$ may be determined using a pixel value of a first decoded pixel $P_A=T_{2,3}$, a pixel value of a second decoded pixel $P_B=TR_{0,3}$, and a pixel value of a third decoded pixel $P_C=T_{3,2}$, which may be expressed as $X_{3,0}=T_{2,3}+TR_{0,3}-T_{3,2}$. A predictor pixel for the current pixel $X_{3,1}$ may be determined using a pixel value of a first decoded pixel $P_A=T_{1,3}$, a pixel value of a second decoded pixel $P_B=TR_{1,3}$, and a pixel value of a third decoded pixel $P_C=T_{3,1}$, which may be expressed as $X_{3,1}=T_{1,3}+TR_{1,3}-T_{3,1}$. A predictor pixel for the current pixel $X_{3,2}$ may be determined using a pixel value of a first decoded pixel $P_A=T_{0,3}$, a pixel value of a second decoded pixel $P_B=TR_{2,3}$, and a pixel value of a third decoded pixel $P_C=T_{3,0}$, which may be expressed as $X_{3,2}=T_{0,3}+TR_{2,3}-T_{3,0}$.

Figure 11:
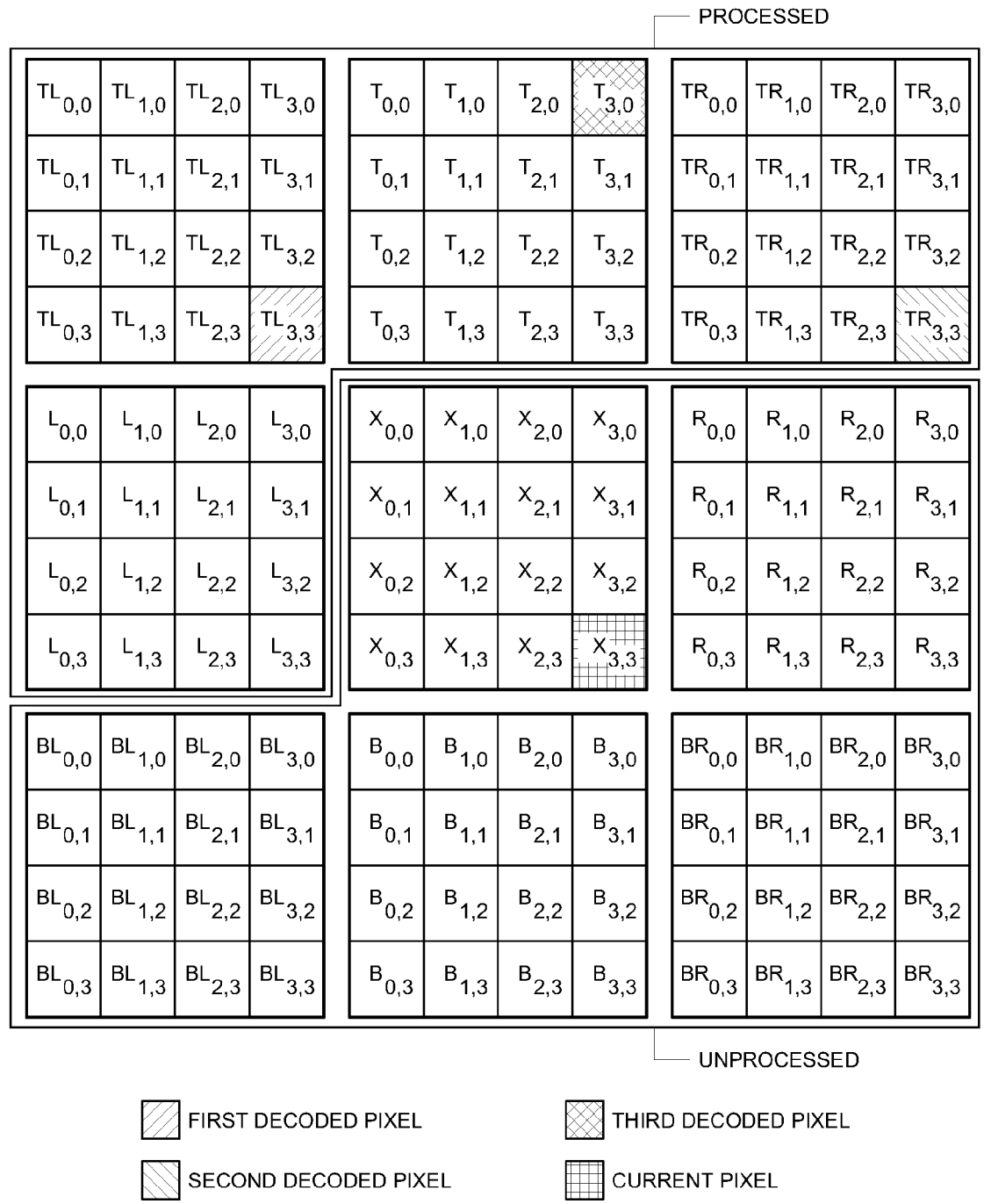

FIG. 11 shows an example of second-order orthogonal spatial intra prediction for decoding another current pixel $X_{3,3}$ in a current block X of a partially decoded frame. As shown, a predictor pixel for the current pixel $X_{3,3}$ may be determined using a pixel value of a first decoded pixel $P_A=TL_{3,3}$, a pixel value of a second decoded pixel $P_B=TR_{3,3}$, and a pixel value of a third decoded pixel $P_C=T_{3,0}$. Determining the predictor pixel may be expressed as $X_{3,3}=TL_{3,3}+TR_{3,3}-T_{3,0}$.

The first decoded pixel $P_A$ may be identified at a first oblique angle $ANGLE_A$ to the current pixel $X_{3,3}$, such as 135° as shown. The first decoded pixel $P_A$ may be the closest decoded pixel to the current pixel $X_{3,3}$ in the frame at the first oblique angle $ANGLE_A$. The second decoded pixel $P_B$ may be identified at a second oblique angle $ANGLE_B$ to the current pixel $X_{3,3}$, such as 45° as shown. The second decoded pixel $P_B$ may be the closest decoded pixel to the current pixel $X_{3,3}$ in the frame at the second oblique angle $ANGLE_B$.

The current pixel $X_{3,3}$, the first decoded pixel $P_A$, the second decoded pixel $P_B$, and the third decoded pixel $P_C$ may be nearly orthogonal. For example, as shown in FIG. 11, the current pixel $X_{3,3}$, the first decoded pixel $P_A$, and the second decoded pixel $P_B$ may be orthogonal with a target pixel outside the frame and the third decoded pixel $P_C$ may be identified such that the third decoded pixel $P_C$ may be the closest decoded pixel in the frame to the target pixel.

Other implementations of the diagrams of second-order orthogonal spatial intra prediction as shown in FIGS. 7-11 are available. In implementations, additional elements of second-order orthogonal spatial intra prediction can be added, certain elements can be combined, and/or certain elements can be removed. Although FIGS. 5-11 show a 3×3 frame of 4×4 blocks of pixels, second-order orthogonal spatial intra prediction may be performed for any size frame of any size blocks.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, as used herein, the term "optimize", or any variations thereof, indicates adjusting, identifying, calculating, determining, selecting, or otherwise obtaining an element according to the methods, or any part or parts thereof, described herein and is not limited to a theoretic or practical best. For example, an optimized value may be greater than, less than, or equal to an unoptimized value. As used herein the term "maximize", or any variation thereof, indicates adjusting, identifying, calculating, determining, selecting, or otherwise obtaining an element or value according to the methods, or any part or parts thereof, described herein and is not limited to a theoretic or practical largest value or result. For example, a maximized value may be greater than, less than, or equal to an unmaximized value. As used herein the term "minimize", or any variation thereof, indicates adjusting, identifying, calculating, determining, selecting, or otherwise obtaining an element or value according to the methods, or any part or parts thereof, described herein and is not limited to a theoretic or practical smallest value or result. For example, a minimized value may be greater than, less than, or equal to a minimized value.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of encoding and decoding described herein illustrate some exemplary encoding and decoding techniques. However, it is to be understood that encoding and decoding, as those terms are used herein may include compression, decompression, transformation, or any other processing or change of data.

The implementations of the transmitting station 12 and/or the receiving station 30 (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 12 and the receiving station 30 do not necessarily have to be implemented in the same manner.

Further, in one implementation, for example, the transmitting station 12 or the receiving station 30 can be implemented using a general purpose computer or general purpose/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

The transmitting station 12 and receiving station 30 can, for example, be implemented on computers in a real-time video system. Alternatively, the transmitting station 12 can be implemented on a server and the receiving station 30 can be implemented on a device separate from the server, such as a hand-held communications device. In this instance, the transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, for example, content that was not transmitted by the transmitting station 12. Other suitable transmitting station 12 and receiving station 30 implementation schemes are available. For example, the receiving station 30 can be a generally stationary personal computer rather than a portable communications device and/or a device including an encoder 70 may also include a decoder 100.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method for processing a frame of a video stream, the method comprising:
   receiving an encoded video stream;
   identifying a current encoded frame from the encoded video stream;
   generating, by a processor in response to instructions stored on a non-transitory computer readable medium, a reconstructed frame by decoding the current encoded frame, wherein generating the reconstructed frame includes:
      generating a plurality of reconstructed blocks by decoding a portion of the current encoded frame,
      identifying a current block from the current encoded frame,
      generating a decoded residual block by decoding the current block,
      identifying a current pixel location in the current block,
      identifying a first reconstructed pixel in a first reconstructed block from the plurality of reconstructed blocks, wherein the first reconstructed pixel is at a first oblique angle to the current pixel location,
      identifying a second reconstructed pixel in a second reconstructed block from the plurality of reconstructed blocks, wherein the second reconstructed pixel is at a second oblique angle to the current pixel location,
      identifying a third reconstructed pixel in a third reconstructed block from the plurality of reconstructed blocks, wherein the third reconstructed pixel is at least one of at the second oblique angle to the first reconstructed pixel or at the first oblique angle to the second reconstructed pixel,
      determining a predictor pixel for the current pixel location using a difference between the third reconstructed pixel and a sum of the first reconstructed pixel and the second reconstructed pixel,
      identifying a reconstructed pixel for the current pixel location as a sum of the predictor pixel and a residual pixel from the decoded residual block corresponding to the current pixel location, and
      including the reconstructed pixel in an output bitstream; and
   outputting the output bitstream for presentation.

2. The method of claim 1, wherein the first reconstructed block is the second reconstructed block, the first reconstructed block is the third reconstructed block, the second reconstructed block is the third reconstructed block, or the first reconstructed block is the second reconstructed block and the third reconstructed block.

3. The method of claim 1, wherein the first reconstructed pixel is a closest reconstructed pixel at the first oblique angle, and the second reconstructed pixel is a closest reconstructed pixel at the second oblique angle.

4. The method of claim 1, wherein the first oblique angle and the second oblique angle are supplementary angles or conjugate angles.

5. The method of claim 1, wherein the first oblique angle and the second oblique angle are conjugate angles, and wherein the reconstructed frame includes a first candidate reconstructed pixel at the second oblique angle and a second candidate reconstructed pixel at a third oblique angle that is supplementary to the first oblique angle, and wherein the first candidate reconstructed pixel and the second candidate reconstructed pixel are equidistant from the current pixel location, further comprising determining whether to use the first candidate reconstructed pixel or the second candidate reconstructed pixel as the second reconstructed pixel.

6. The method of claim 1, wherein the current pixel location, the first reconstructed pixel, the second reconstructed pixel, and the third reconstructed pixel are orthogonal.

7. The method of claim 1, wherein at least one of the first reconstructed pixel, the second reconstructed pixel, or the third reconstructed pixel is an unavailable pixel, further comprising using an alternate pixel instead of the unavailable pixel.

8. The method of claim 7, further comprising identifying the alternate pixel by:
   on a condition that the reconstructed frame includes a candidate reconstructed pixel in a fourth reconstructed block in the reconstructed frame at a third oblique angle to the current pixel location such that a vector from the current pixel location to the candidate reconstructed pixel is collinear with a vector from the current pixel location to the unavailable pixel, using the candidate reconstructed pixel as the alternate pixel; and
   on a condition that the reconstructed frame includes a candidate reconstructed pixel in a fourth reconstructed block in the reconstructed frame such that the candidate reconstructed pixel is the closest available pixel in the reconstructed frame to the unavailable pixel, using the candidate reconstructed pixel as the alternate pixel.

9. The method of claim 1, wherein the first oblique angle is oblique to an axis of the reconstructed frame and the second oblique angle is oblique to the axis of the reconstructed frame.

10. A method for processing a frame of a video stream, the method comprising:
   receiving an input video stream;
   identifying a current input frame from the input video stream;
   generating, by a processor in response to instructions stored on a non-transitory computer readable medium, an encoded frame by encoding the current input frame, wherein generating the encoded frame includes:
      generating a plurality of reconstructed blocks by encoding a portion of the current input frame,
      identifying a current block from the current input frame,
      identifying a current pixel from the current block,
      identifying a first reconstructed pixel in a first reconstructed block from the plurality of reconstructed blocks, wherein the first reconstructed pixel is at a first oblique angle to the current pixel,
      identifying a second reconstructed pixel in a second reconstructed block from the plurality of reconstructed blocks, wherein the second reconstructed pixel is at a second oblique angle to the current pixel,
      identifying a third reconstructed pixel in a third reconstructed block from the plurality of reconstructed blocks, wherein the third reconstructed pixel is at least one of at the second oblique angle to the first reconstructed pixel or at the first oblique angle to the second reconstructed pixel,
      determining a predictor pixel for the current pixel location using a difference between the third reconstructed pixel and a sum of the first reconstructed pixel and the second reconstructed pixel,
      generating a residual for the current pixel using a difference between the current pixel and the predictor pixel, and
      including the residual in an output bitstream; and
   transmitting or storing the output bitstream.

11. The method of claim 10, wherein the first reconstructed block is the second reconstructed block, the first reconstructed block is the third reconstructed block, the second reconstructed block is the third reconstructed block, or the first reconstructed block is the second reconstructed block and the third reconstructed block.

12. The method of claim 10, wherein the first reconstructed pixel is a closest reconstructed pixel at the first oblique angle, and the second reconstructed pixel is a closest reconstructed pixel at the second oblique angle.

13. The method of claim 10, wherein the first oblique angle and the second oblique angle are supplementary angles or conjugate angles.

14. The method of claim 10, wherein the first oblique angle and the second oblique angle are conjugate angles, and wherein the plurality of reconstructed blocks includes a first candidate reconstructed pixel at the second oblique angle and a second candidate reconstructed pixel at a third oblique angle that is supplementary to the first oblique angle, and wherein the first candidate reconstructed pixel and the second candidate reconstructed pixel are equidistant from the current pixel, further comprising determining whether to use the first candidate reconstructed pixel or the second candidate reconstructed pixel as the second reconstructed pixel.

15. The method of claim 10, wherein the current pixel, the first reconstructed pixel, the second reconstructed pixel, and the third reconstructed pixel are orthogonal.

16. The method of claim 10, wherein at least one of the first reconstructed pixel, the second reconstructed pixel, or the third reconstructed pixel is an unavailable pixel, further comprising using an alternate pixel instead of the unavailable pixel.

17. The method of claim 16, further comprising identifying the alternate pixel by:
   on a condition that the plurality of reconstructed blocks includes a candidate reconstructed pixel in a fourth reconstructed block at a third oblique angle to the current pixel such that a vector from the current pixel to the candidate reconstructed pixel is collinear with a vector from the current pixel to the unavailable pixel, using the candidate reconstructed pixel as the alternate pixel; and
   on a condition that the plurality of reconstructed blocks includes a candidate reconstructed pixel in a fourth reconstructed block such that the candidate reconstructed pixel is the closest available pixel in the plurality of reconstructed blocks to the unavailable pixel, using the candidate reconstructed pixel as the alternate pixel.

18. The method of claim 10, wherein the first oblique angle is oblique to an axis of the encoded frame and the second oblique angle is oblique to the axis of the encoded frame.

19. A method for processing a frame of a video stream, the method comprising:
- identifying a current frame from the video stream;
- generating, by a processor in response to instructions stored on a non-transitory computer readable medium, a reconstructed frame based on the current frame, wherein generating the reconstructed frame includes:
    - generating a plurality of reconstructed blocks by processing a first portion of the current frame;
    - identifying a current pixel from a current block from a plurality of blocks from a second portion of the current frame;
    - identifying a first reconstructed pixel from a first reconstructed block from the plurality of reconstructed blocks, wherein the first reconstructed pixel is at a first angle to the current pixel;
    - identifying a second reconstructed pixel from a second reconstructed block from the plurality of reconstructed blocks, wherein the second reconstructed pixel is at a second angle to the current pixel;
    - identifying a third reconstructed pixel from a third reconstructed block in the plurality of reconstructed blocks, wherein the third reconstructed pixel is at least one of at the second angle to the first reconstructed pixel or at the first angle to the second reconstructed pixel; and
    - determining a predictor pixel for the current pixel using a difference between the third reconstructed pixel and a sum of the first reconstructed pixel and the second reconstructed pixel.

20. The method of claim 19, wherein the first angle is a first oblique angle and the second angle is a second oblique angle.

* * * * *